US010868607B2

(12) United States Patent
Zhang et al.

(10) Patent No.: US 10,868,607 B2
(45) Date of Patent: Dec. 15, 2020

(54) PHASE TRACKING REFERENCE SIGNAL (PT-RS) POWER BOOSTING

(71) Applicant: Apple Inc., Cupertino, CA (US)

(72) Inventors: Yushu Zhang, Beijing (CN); Gang Xiong, Beaverton, OR (US); Honglei Miao, Nuremberg (DE); Hong He, Beijing (CN); Guotong Wang, Beijing (CN); Alexei Vladimirovich Davydov, Nizhny Novgorod (RU); Seunghee Han, San Jose, CA (US); Avik Sengupta, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/792,781

(22) Filed: Feb. 17, 2020

(65) Prior Publication Data

US 2020/0186226 A1 Jun. 11, 2020

Related U.S. Application Data

(63) Continuation of application No. 16/238,232, filed on Jan. 2, 2019, now Pat. No. 10,594,382, which is a
(Continued)

(51) Int. Cl.
*H04W 52/16* (2009.01)
*H04B 7/06* (2006.01)
(Continued)

(52) U.S. Cl.
CPC ......... *H04B 7/0669* (2013.01); *H04B 7/0478* (2013.01); *H04B 7/0486* (2013.01);
(Continued)

(58) Field of Classification Search
CPC .................................................. H04B 7/0669
See application file for complete search history.

(56) References Cited

U.S. PATENT DOCUMENTS 6,141,384 A * 10/2000 Wittig ................. H03M 13/256
375/240.25
6,721,366 B1 * 4/2004 Van Stralen ...... H04L 25/03273
375/262
(Continued)

OTHER PUBLICATIONS

"Physical channels and modulation (Release 15)", 3GPP TS 38.211; V2.0.0 (Dec. 2017) Section 7.4, (2017), 73 pgs.

*Primary Examiner* — Qutbuddin Ghulamali
(74) *Attorney, Agent, or Firm* — Kowert, Hood, Munyon, Rankin & Goetzel, P.C.

(57) ABSTRACT

User equipment (UE) can include processing circuitry configured to decode radio resource control (RRC) signaling from a base station, the RRC signaling indicating a transmission coding scheme for a physical uplink shared channel (PUSCH) transmission. PUSCH-to-phase tracking reference signal (PT-RS) energy per resource element (EPRE) ratio is determined using the RRC signaling. A PT-RS power boosting factor is determined based on the transmission coding scheme and the PUSCH-to-PT-RS EPRE ratio. The PT-RS is encoded for transmission using a plurality of PT-RS symbols, the transmission using increased transmission power corresponding to the PT-RS power boosting factor. The RRC signaling further includes a flag enabling the PT-RS transmission. The PUSCH-to-PT-RS EPRE ratio is 00 or 01, and the transmission coding scheme is a codebook-based uplink transmission or non-codebook-based uplink transmission.

21 Claims, 16 Drawing Sheets

Related U.S. Application Data continuation of application No. PCT/CN2018/082089, filed on Apr. 6, 2018, which is a continuation of application No. PCT/CN2018/072422, filed on Jan. 12, 2018.

(60) Provisional application No. 62/612,943, filed on Jan. 2, 2018.

(51) Int. Cl.
| | |
|---|---|
| *H04B 7/0456* | (2017.01) |
| *H04L 1/00* | (2006.01) |
| *H04W 76/27* | (2018.01) |
| *H04W 52/26* | (2009.01) |

(52) U.S. Cl.
CPC ........... *H04B 7/063* (2013.01); *H04B 7/0689* (2013.01); *H04L 1/001* (2013.01); *H04L 1/0004* (2013.01); *H04W 52/16* (2013.01); *H04W 52/262* (2013.01); *H04W 76/27* (2018.02)

(56) References Cited

U.S. PATENT DOCUMENTS

| | | | | |
|---|---|---|---|---|
| 8,243,834 B2* | 8/2012 | Kishigami | ............. | H04B 7/084 375/260 |
| 8,718,203 B2* | 5/2014 | Jacobsen | ........... | H04L 25/03057 375/262 |

* cited by examiner

TABLE: INDICATION OF A_DL AND PT-RS POWER BOOSTING

| PDSCH-TO-PT-RS EPRE RATIO (A_DL) | THE NUMBER OF DM-RS PORTS ASSOCIATED TO PT-RS PORT i | | | | | |
|---|---|---|---|---|---|---|
| | 1 | 2 | 3 | 4 | 5 | 6 |
| 00 | 0 | 3 | 4.77 | 6 | 7 | 7.78 |
| 01 | 0 | 0 | 0 | 0 | 0 | 0 |
| 10 | RESERVED | | | | | |
| 11 | RESERVED | | | | | |

FIG. 7A

TABLE: INDICATION OF A_UL AND PT-RS POWER BOOSTING

| PDSCH-TO-PT-RS EPRE RATIO (A_UL) | THE NUMBER OF DM-RS PORTS ASSOCIATED TO PT-RS PORT i | | | | | |
|---|---|---|---|---|---|---|
| | 1 | 2 | 3 | 4 | | |
| 00 | 0 | 3 | 4.77 | 6 | | |
| 01 | RESERVED | | | | | |
| 10 | RESERVED | | | | | |
| 11 | RESERVED | | | | | |

FIG. 7B

TABLE: INDICATION OF A_DL AND PT-RS POWER BOOSTING

| PDSCH-TO-PT-RS EPRE RATIO (A_DL) | THE NUMBER OF DM-RS PORTS ASSOCIATED TO PT-RS PORT i | | | | | |
|---|---|---|---|---|---|---|
| | 1 | 2 | 3 | 4 | 5 | 6 |
| 00 | 0 | 0 | 0 | 0 | 0 | 0 |
| 01 | 0 | 3 | 3 | 3 | 3 | 3 |
| 10 | 0 | 3 | 4.77 | 6 | 6 | 6 |
| 11 | 0 | 3 | 4.77 | 6 | 7 | 7.78 |

FIG. 8

TABLE: INDICATION OF A_DL AND PT-RS POWER BOOSTING WHEN NUMBER OF DM-RS PORTS ASSOCIATED TO PT-RS PORT IS ABOVE 6 AND PT-RS DENSITY IS EVERY OTHER SYMBOL OR EVERY 4TH SYMBOL

| PDSCH-TO-PT-RS EPRE RATIO (A_DL) | THE NUMBER OF DM-RS PORTS ASSOCIATED TO PT-RS PORT i | | | | | |
|---|---|---|---|---|---|---|
| | 7 | 8 | 9 | 10 | 11 | 12 |
| 00 | 0 | 0 | 0 | 0 | 0 | 0 |
| 01 | 3 | 3 | 3 | 3 | 3 | 3 |
| 10 | 6 | 6 | 6 | 6 | 6 | 6 |
| 11 | 8.45 | 9.03 | 9.54 | 10 | 10.41 | 10.79 |

FIG. 9

TABLE: INDICATION OF A_UL AND PT-RS POWER BOOSTING

| PDSCH-TO-PT-RS EPRE RATIO (A_UL) | THE NUMBER OF DM-RS PORTS ASSOCIATED TO PT-RS PORT i | | | |
|---|---|---|---|---|
| | 1 | 2 | 3 | 4 |
| 00 | 0 | 0 | 0 | 0 |
| 01 | 0 | 3 | 3 | 3 |
| 10 | 0 | 3 | 4.77 | 6 |
| 11 | RESERVED | | | |

FIG. 10

TABLE: UPLINK PT-RS POWER BOOSTING

| UL-PTRS-POWER / $\alpha_{PTRS}^{PUSCH}$ (or A_UL) | THE NUMBER OF PUSCH LAYERS ($n_{layer}^{PUSCH}$) (or # of DMRS PORTS) | | | | | | | |
|---|---|---|---|---|---|---|---|---|
| | 1 | 2 | | 3 | | 4 | | |
| | ALL CASES | FULL COHERENT AND NON-CODEBOOK CASE 1 | PARTIAL AND NON-COHERENT AND NON-CODEBOOK CASE 2 | FULL COHERENT AND NON-CODEBOOK CASE 1 | PARTIAL AND NON-COHERENT AND NON-CODEBOOK CASE 2 | FULL COHERENT AND NON-CODEBOOK CASE 1 | PARTIAL COHERENT | NON-COHERENT AND NON-CODEBOOK CASE 2 |
| 00 | 0 | 3 | 3Qp-3 | 4.77 | 3Qp-3 | 6 | 3Qp | 3Qp-3 |
| 01 | 0 | 3 | 3 | 4.77 | 4.77 | 6 | 6 | 6 |
| 10 | RESERVED | | | | | | | |
| 11 | RESERVED | | | | | | | |

FIG. 12A

TABLE: UPLINK PT-RS POWER BOOSTING

| UL-PTRS-POWER / $\alpha_{PTRS}^{PUSCH}$ (or A_UL) | THE NUMBER OF PUSCH LAYERS ($n_{layer}^{PUSCH}$) (or # of DMRS PORTS) | | | | | | | |
|---|---|---|---|---|---|---|---|---|
| | 1 | 2 | | 3 | | 4 | | |
| | ALL CASES | FULL COHERENT | PARTIAL AND NON-COHERENT AND NON-CODEBOOK BASED | FULL COHERENT | PARTIAL AND NON-COHERENT AND NON-CODEBOOK BASED | FULL COHERENT | PARTIAL COHERENT | NON-COHERENT AND NON-CODEBOOK BASED |
| 00 | 0 | 3 | 3Qp-3 | 4.77 | 3Qp-3 | 6 | 3Qp | 3Qp-3 |
| 01 | 0 | 3 | 3 | 4.77 | 4.77 | 6 | 6 | 6 |
| 10 | | | | RESERVED | | | | |
| 11 | | | | RESERVED | | | | |

FIG. 12B

TABLE: 2TX CODEBOOK FOR A RANK 2 CASE

| TPMI index | $W$ (ordered from left to right in increasing order of TPMI index) | | |
|---|---|---|---|
| 0 – 2 | $\frac{1}{\sqrt{2}}\begin{bmatrix}1 & 0 \\ 0 & 1\end{bmatrix}$ | $\frac{1}{2}\begin{bmatrix}1 & 1 \\ 1 & -1\end{bmatrix}$ | $\frac{1}{2}\begin{bmatrix}1 & 1 \\ j & -j\end{bmatrix}$ |

PHASE TRACKING REFERENCE SIGNAL (PT-RS) POWER BOOSTING

PRIORITY CLAIM

This invention is a continuation application of U.S. patent application Ser. No. 16/238,232, entitled "Phase Tracking Reference Signal (PT-RS) Power Boosting", filed Jan. 2, 2019, which is a continuation of PCT/CN2018/082089, filed Apr. 6, 2018, which is a continuation of PCT/CN2018/072422, filed Jan. 12, 2018, which claims the benefit of U.S. provisional application No. 62/612,943, filed Jan. 2, 2018, whose disclosures are incorporated herein by reference.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications."

Each of the above-identified patent applications is incorporated herein by reference in its entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including 5G new radio (NR) (or 5G-NR) networks and 5G-LTE networks. Other aspects are directed to systems and methods for phase tracking reference signal (PT-RS) port indication. Additional aspects are directed to systems and methods for PT-RS power boosting. BACKGROUND Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. Fifth generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LIE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LIE system in the unlicensed spectrum, according to which LTE-based technology solely operates in unlicensed spectrum without requiring an "anchor" in the licensed spectrum, called MulteFire. MulteFire combines the performance benefits of LTE technology with the simplicity of Wi-Fi-like deployments.

Further enhanced operation of LIE systems in the licensed as well as unlicensed spectrum is expected in future releases and 5G systems. Such enhanced operations can include techniques to address PT-RS port indication and PT-RS power boosting.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

FIG. 7A is a table indicating physical downlink shared channel to PT-RS energy per resource element (PDSCH-to-PT-RS EPRE) ratio and associated PT-RS power boosting, in accordance with some aspects.

FIG. 7B is a table indicating physical uplink shared channel to PT-RS energy per resource element (PUSCH-to-PT-RS EPRE) ratio and associated PT-RS power boosting, in accordance with some aspects.

FIG. 8 is a table indicating PDSCH-to-PT-RS EPRE ratio and associated PT-RS power boosting, in accordance with some aspects.

FIG. 9 is a table indicating PDSCH-to-PT-RS EPRE ratio and associated PT-RS power boosting when a number of DM-RS ports associated to a PT-RS port is above six and PT-RS density is every other symbol or every fourth symbol, in accordance with some aspects.

FIG. 10 is a table indicating physical uplink shared channel-to-PT-RS EPRE (PUSCH-to-PT-RS EPRE) ratio and associated PT-RS power boosting, in accordance with some aspects.

FIG. 12A is a table indicating PUSCH-to-PT-RS EPRE ratio and associated PT-RS power boosting based on a transmission scheme, in accordance with some aspects.

FIG. 12B is a table indicating PUSCH-to-PT-RS EPRE ratio and associated PT-RS power boosting based on a transmission scheme, in accordance with some aspects.

FIG. 13 is a table indicating precoder (W) values for a 2 Tx codebook scenario, in accordance with some aspects.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Figure 1A:
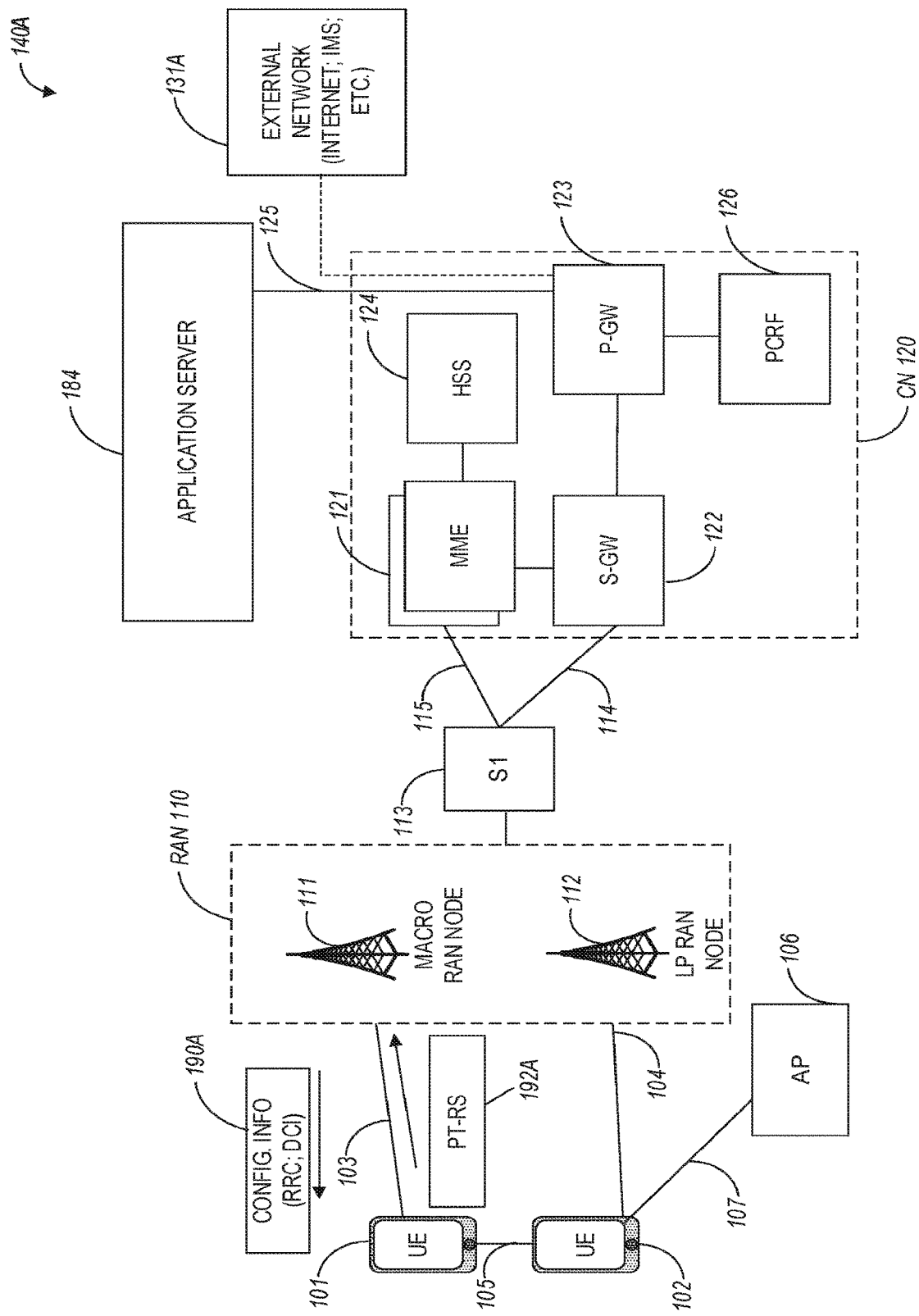
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technologies and/or standards.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single LE, thus increasing the bandwidth available to a single device. In some aspects, carrier aggregation may be used where one or more component carriers operate on unlicensed frequencies.

There are emerging interests in the operation of LTE systems in the unlicensed spectrum. As a result, an important enhancement for LTE in 3GPP Release 13 has been to enable its operation in the unlicensed spectrum via Licensed-Assisted Access (LAA), which expands the system bandwidth by utilizing the flexible carrier aggregation (CA) framework introduced by the LTE-Advanced system. Rel-13 LAA system focuses on the design of downlink operation on unlicensed spectrum via CA, while Rel-14 enhanced LAA (eLAA) system focuses on the design of uplink operation on unlicensed spectrum via CA.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) wherein particular the 400 MHz and 700 MHz bands can be employed. Besides cellular applications, specific applications for vertical markets may be addressed, such as POISE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, NB-IoT devices can be configured to operate in a single physical resource block (PRB) and may be instructed to retune two different PRBs within the system bandwidth. In some aspects, an eNB-IoT UE can be configured to acquire system information in one PRB, and then it can retune to a different PRB to receive or transmit data.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In some aspects, the network 140A can include a core network (CN) 120. Various aspects of NG RAN and NG Core are discussed herein in reference to, e.g., FIG. 1B and FIG. 1C.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an evolved node-B (eNB), or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe for sidelink communications), although such aspects are not required. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation may be used for OFDM systems, which makes it applicable for radio resource allocation. Each column and each row of the resource grid may correspond to one OFDM symbol and one OFDM subcarrier, respectively. The duration of the resource grid in the time domain may correspond to one slot in a radio frame. The smallest time-frequency unit in a resource grid may be denoted as a resource element. Each resource grid may comprise a number of resource blocks, which describe the mapping of certain physical channels to resource elements. Each resource block may comprise a collection of resource elements; in the frequency domain, this may, in some aspects, represent the smallest quantity of resources that currently can be allocated. There may be several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced control channel elements (ECCEs). Similar to above, each ECCE may correspond to nine sets of four physical resource elements known as an enhanced resource element groups (EREGs). An ECCE may have other numbers of EREGs according to some arrangements.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1I). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMES 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-CiW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123. The application server 184 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 184.

In an example, any of the nodes 111 or 112 can be configured to communicate to the UEs 101, 102 (e.g., dynamically) an antenna panel selection and a receive (Rx) beam selection that can be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101, 102 (e.g., dynamically) an antenna panel selection and a transmit (Tx) beam selection that can be used by the UE for data transmission on a physical uplink shared channel (PUSCH) as well as for sounding reference signal (SRS) transmission.

In some aspects, the communication network 140A can be an IoT network. One of the current enablers of IoT is the narrowband-IoT (NB-IoT). NB-IoT has objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of the following three modalities: (a) standalone deployment (the network operates in re-farmed GSM spectrum); (b) in-band deployment (the network operates within the LTE channel); and (c) guard-band deployment (the network operates in the guard band of legacy LTE channels). In some aspects, such as with further enhanced NB-IoT (FeNB-IoT), support for NB-IoT in small cells can be provided (e.g., in microcell, picocell or femtocell deployments). One of the challenges NB-IoT systems face for small cell support is the UL/DL link imbalance, where for small cells the base stations have lower power available compared to macrocells, and, consequently, the DL coverage can be affected and/or reduced. In addition, some NB-IoT UEs can be configured to transmit at maximum power if repetitions are used for UL transmission. This may result in large inter-cell interference in dense small cell deployments.

In some aspects, the UE 101 can receive configuration information 190A via, e.g., higher layer signaling or other types of signaling. The configuration information 190A can include downlink control information (DCI) or radio resource control (RRC) information that can be used for PT-RS port indication as well as for configuring PT-RS power boosting as disclosed hereinbelow. In response to the configuration information, the UE 101 can communicate PT-RS information 192A back to the gNB 111, as described hereinbelow.

Figure 1B:
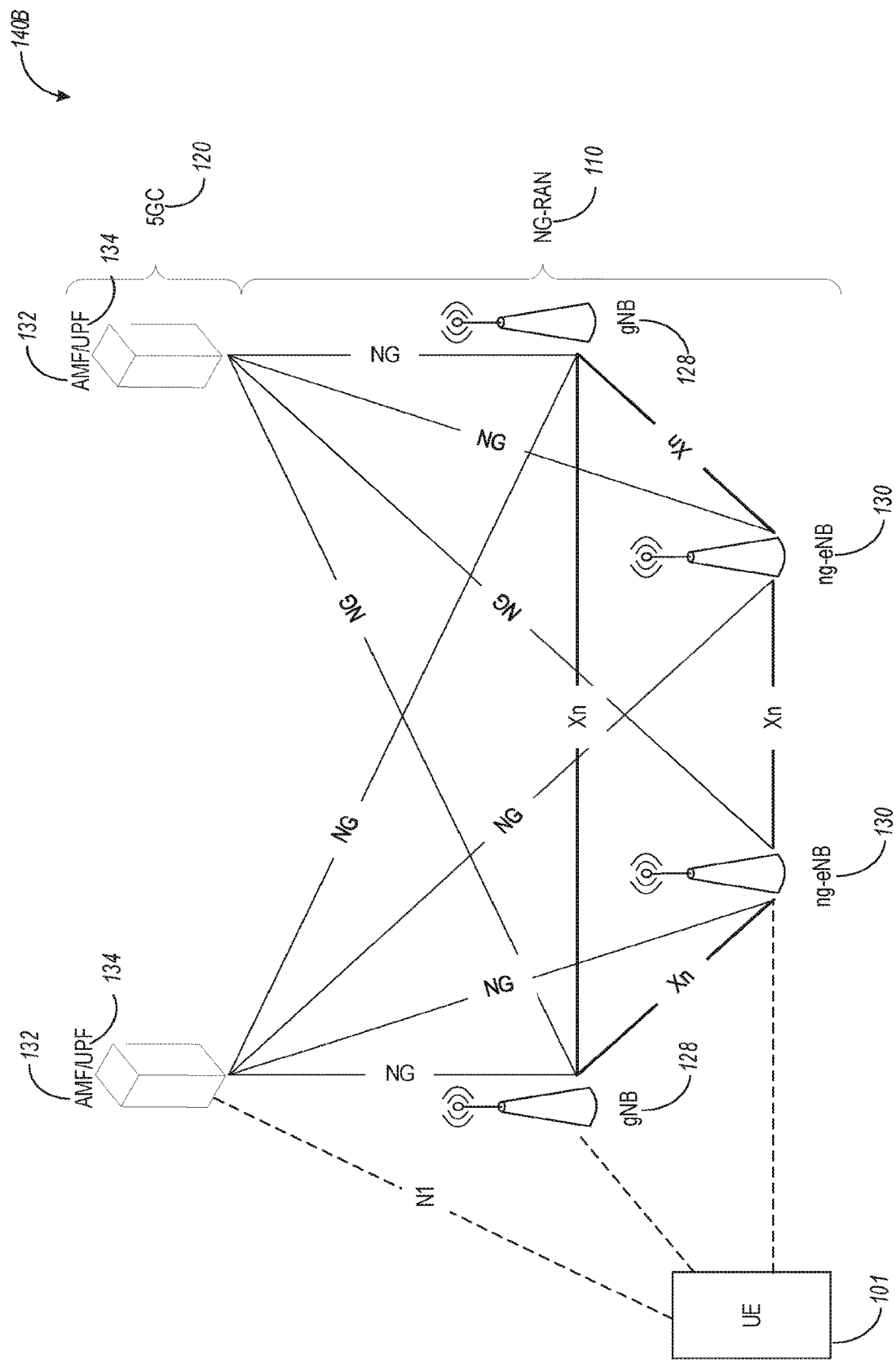
FIG. 1B is a simplified diagram of an overall next generation (NG) system architecture, in accordance with some aspects.

FIG. 1B is a simplified diagram of a next generation (NG) system architecture 140B in accordance with some aspects. Referring to FIG. 1B, the NG system architecture 140B includes RAN 110 and a 5G network core (5GC) 120. The NG-RAN 110 can include a plurality of nodes, such as gNBs 128 and NG-eNBs 130.

The core network 120 (e.g., a 5G core network or 5GC) can include an access and mobility management function (AMF) 132 and/or a user plane function (UPF) 134. The AMF 132 and the UPF 134 can be communicatively coupled to the gNBs 128 and the NG-eNBs 130 via NG interfaces. More specifically, in some aspects, the gNBs 128 and the NG-eNBs 130 can be connected to the AMF 132 by NG-C interfaces, and to the UPF 134 by NG-U interfaces. The gNBs 128 and the NG-eNBs 130 can be coupled to each other via Xn interfaces.

In some aspects, a gNB 128 can include a node providing new radio (NR) user plane and control plane protocol termination towards the UE and is connected via the NG interface to the 5GC 120. In some aspects, an NG-eNB 130 can include a node providing evolved universal terrestrial radio access (E-UTRA) user plane and control plane protocol terminations towards the UE and is connected via the NG interface to the 5GC 120.

In some aspects, each of the gNBs 128 and the NG-eNBs 130 can be implemented as a base station, a mobile edge server, a small cell, a home eNB, and so forth.

Figure 1C:
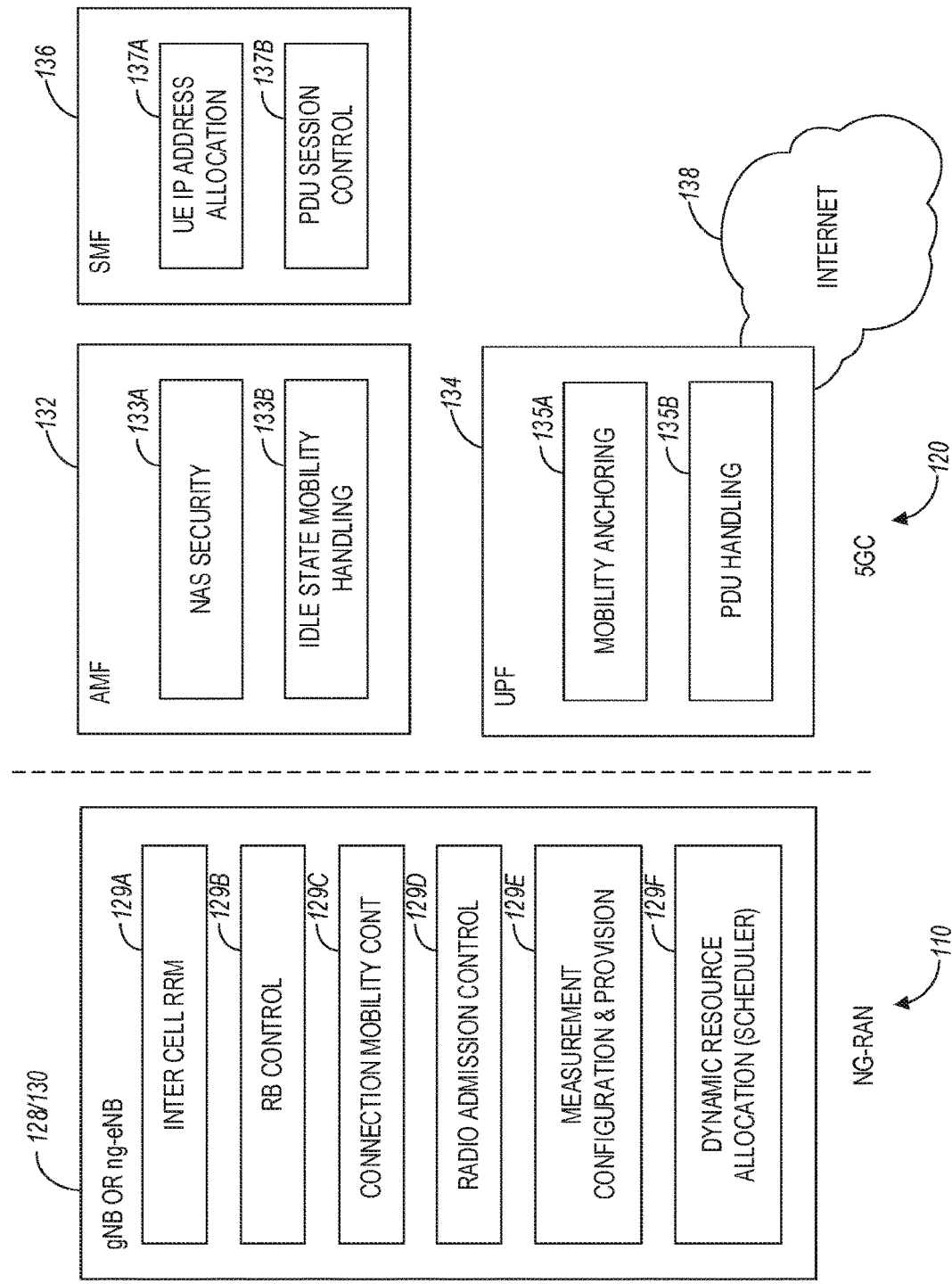
FIG. 1C illustrates a functional split between next generation radio access network (NG-RAN) and the SG Core network (5GC), in accordance with some aspects.

FIG. 1C illustrates a functional split between NG-RAN and the 5G Core (5GC) in accordance with some aspects. Referring to FIG. 1D, there is illustrated a more detailed diagram of the functionalities that can be performed by the gNBs 128 and the NG-eNBs 130 within the NG-RAN 110, as well as the AMF 132, the UPF 134, and the SMF 136 within the 5GC 120. In some aspects, the 5GC 120 can provide access to the Internet 138 to one or more devices via the NG-RAN 110.

In some aspects, the gNBs 128 and the NG-eNBs 130 can be configured to host the following functions: functions for Radio Resource Management (e.g., inter-cell radio resource management 129A, radio bearer control 129B, connection mobility control 129C, radio admission control 129D, dynamic allocation of resources to UEs in both uplink and downlink (scheduling) 129F; IP header compression, encryption and integrity protection of data; selection of an AMF at UE attachment when no routing to an AMF can be determined from the information provided by the UE; routing of User Plane data towards UPF(s); routing of Control Plane information towards AMF; connection setup and release; scheduling and transmission of paging messages (originated from the AMF); scheduling and transmission of system broadcast information (originated from the AMF or Operation and Maintenance); measurement and measurement reporting configuration for mobility and scheduling 129E; transport level packet marking in the uplink; session management; support of network slicing; QoS flow management and mapping to data radio bearers; support of UEs in RRC INACTIVE state; distribution function for non-access stratum (NAS) messages; radio access network sharing; dual connectivity; and tight interworking between NR and E-UTRA, to name a few.

In some aspects, the AMF 132 can be configured to host the following functions, for example: NAS signaling termination; NAS signaling security 133A; access stratum (AS) security control; inter-core network (CN) node signaling for mobility between 3GPP access networks; idle state/mode mobility handling 133B, including mobile device, such as a UE reachability (e.g., control and execution of paging retransmission); registration area management; support of intra-system and inter-system mobility; access authentication; access authorization including check of roaming rights; mobility management control (subscription and policies); support of network slicing; and/or SMF selection, among other functions.

The UPF 134 can be configured to host the following functions, for example: mobility anchoring 135A (e.g., anchor point for Intra-/Inter-RAT mobility); packet data unit (PDU) handling 135B (e.g., external PDU session point of interconnect to data network); packet routing and forwarding; packet inspection and user plane pail of policy rule enforcement; traffic usage reporting; uplink classifier to support routing traffic flows to a data network; branching point to support multi-homed PDU session; QoS handling for user plane, e.g., packet filtering, gating, UL/DL rate enforcement; uplink traffic verification (SDF to QoS flow mapping); and/or downlink packet buffering and downlink data notification triggering, among other functions.

The Session Management function (SMF) 136 can be configured to host the following functions, for example: session management; UE IP address allocation and management 137A; selection and control of user plane function (UPF); PDU session control 137B, including configuring traffic steering at UPF 134 to route traffic to proper destination; control part of policy enforcement and QoS; and/or downlink data notification, among other functions.

Phase Tracking Reference Signal (PT-RS) is used to compensate for the phase shift caused by phase noise and carrier frequency offset (CFO). One PT-RS Antenna Port (AP) can share the same precoder with one Demodulation Reference Signal (DM-RS) AP. Since the common phase error (CPE) caused by the phase noise can be common for multiple APs, the number of PT-RS APs can be smaller than that of DM-RS AP(s).

For the downlink, the number of PT-RS AP(s) can be configured per Transmission Configuration indication (TCI) state and the TCI for PDSCH can be used to identify the beam, which could be indicated by Downlink Control Information (DCI). In one aspect, given the number of DL PT-RS AP(s) in TCI1 can be 2 and the number of DL PT-RS AP(s) in TCI2 can be 1 when the TCI1 is indicated in the DCI, the number of PT-RS AP(s) could be 2.

However, in a slot, the UE may receive the downlink signal from multiple gNBs, including the PDCCH and PDSCH. Then there could be multiple TCI(s) received from multiple PDCCHs. In this case, how to determine the number of PT-RS AP(s) can be addressed using techniques disclosed herein. Further, the TCI may not be present in some Control Resource Set (COREST) which is used to carry the PDCCH, then how to determine the number of PT-RS AP(s) when TCI is not present for some CORESET(s) can be addressed using techniques disclosed herein.

Moreover, for uplink, the number of PT-RS AP(s) is dynamically configured as follows:

(a) For codebook-based transmission, the number of PT-RS AP(s) is determined by the precoder. Then to support multiple gNB receptions, the PUSCH may be triggered by multiple DCIs. In this case, how to determine the number of PT-RS AP(s) could be one issue. In addition, the precoder may be different in a different band, then how to determine the PT-RS AP(s) when subband precoder is used can be addressed using techniques disclosed herein.

(b) For non-codebook-based transmission, the number of PT-RS AP(s) is determined by the PT-RS AP index configured per SRS resource. The SRS resources that share the same PT-RS AP index could use the same PT-RS AP(s). However, how to determine the number of PT-RS AP(s) if multiple DCI(s) are configured can be addressed using techniques disclosed herein.

In addition, for uplink multi-panel and multi-TRP operation, the LE may use different transmission schemes in different panels, then how to determine the PT-RS AP(s) can be addressed using techniques disclosed herein.

Techniques disclosed herein can be used to indicate the PT-RS antenna ports, including downlink PT-RS AP(s) indication based on TCI and uplink PT-RS AP(s) indication based on precoder or sounding reference signal (SRS) resource indicator (SRI).

Downlink (DL) PT-RS AP(s) Indication

Downlink PT-RS AP(s) can be determined by the number of DL PT-RS AP(s) configured in TCI. However, the TCI used for PDSCH beam indication may not be present for a CORESET, and in a slot, a UE may receive multiple PDCCHs from multiple gNBs.

Figure 2:
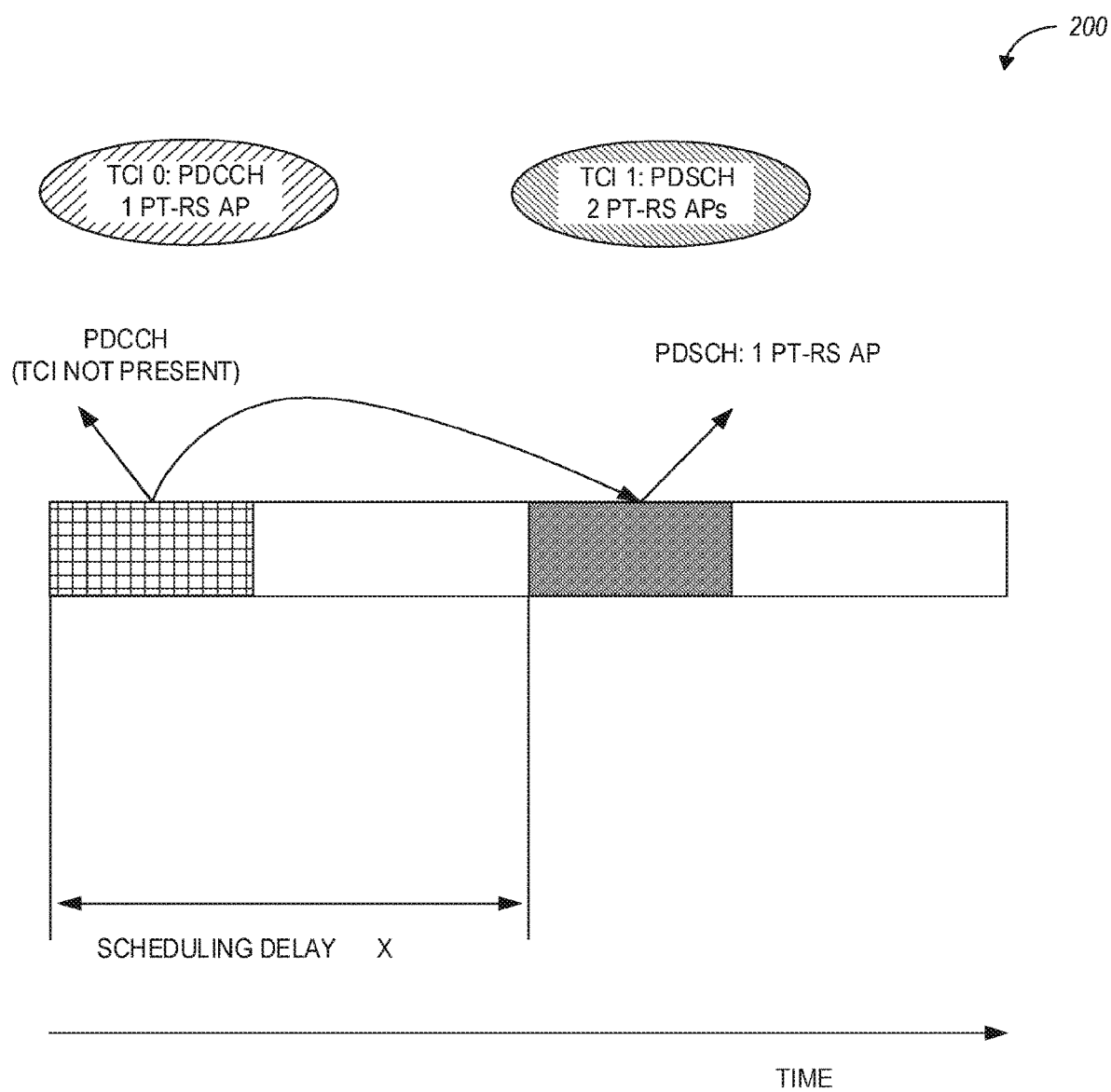
FIG. 2 illustrates PT-RS antenna port (AP) determination when transmission configuration indication (TCI) is not present, in accordance with some aspects.

FIG. 2 illustrates PT-RS antenna port (AP) determination 200 when transmission configuration indication (TCI) is not present, in accordance with some aspects.

In some aspects, when a UE (such as UE 101) receives the PDCCH in a CORESET where the TCI is not present, the UE may determine the number of DL PT-RS AP(s) based on a TCI state used for the PDCCH scheduling the PDSCH, which can be predefined in specification and/or configured by higher layer signaling (e.g., RRC signaling). In some aspects, the TCI state used for the PDCCH may also be used for the beam indication for the scheduled PDSCH. In one aspect, the TCI could be the one used for the PDCCH with the lowest CORESET ID in a current slot or in the latest slot that the UE is configured. FIG. 2 illustrates an example of the number of PT-RS AP(s) determination for this case.

Figure 3:
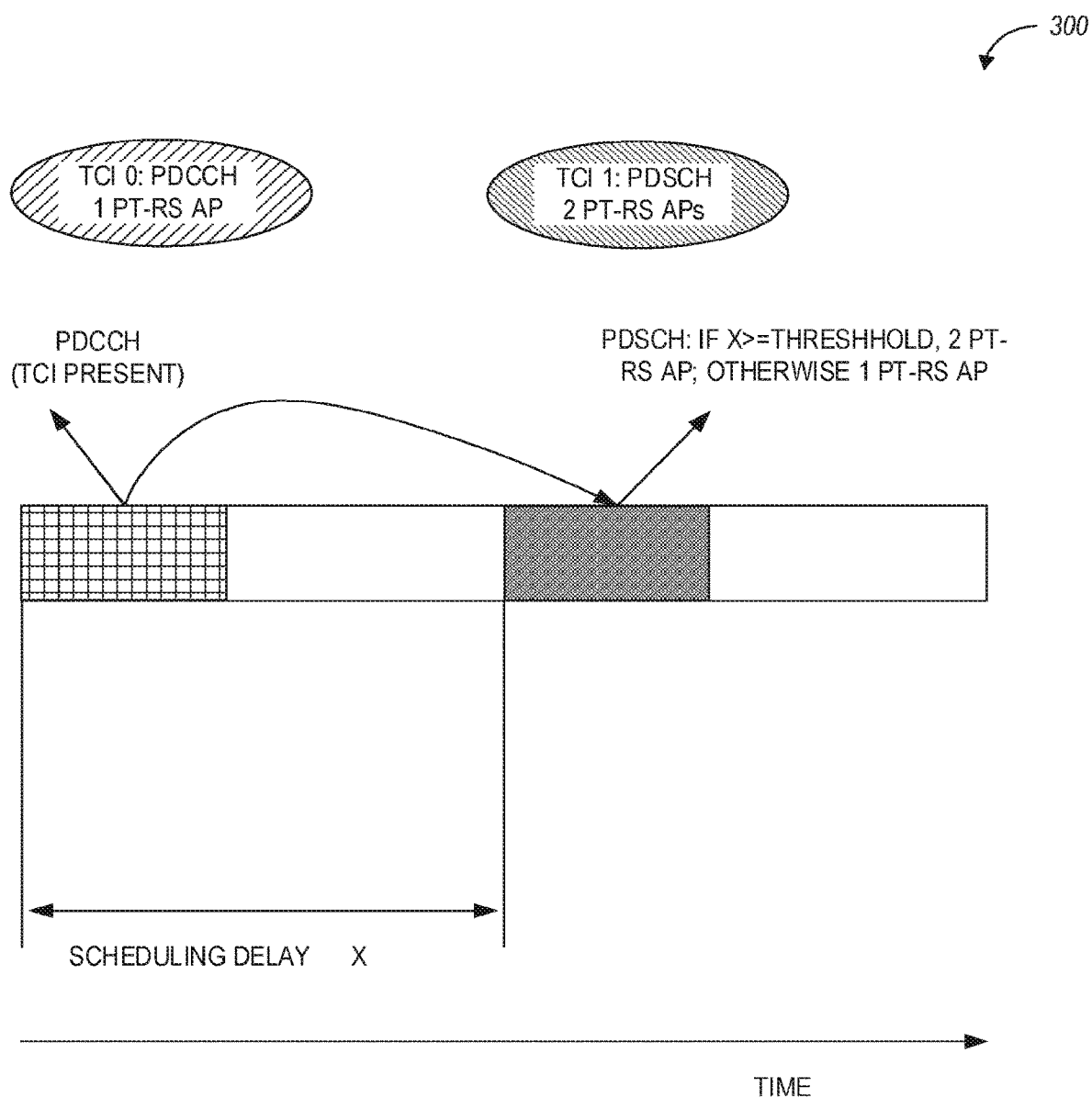
FIG. 3 illustrates PT-RS AP determination when TCI is present, in accordance with some aspects.

FIG. 3 illustrates PT-RS AP determination 300 when TCI is present, in accordance with some aspects. In some aspects, if the TCI is present and the scheduling offset between the reception of the DL DCI and the corresponding PDSCH is below or less than a threshold, the number of DL PT-RS AP(s) can be based on a TCI state used for the PDCCH, which can be predefined and/or configured by higher layer signaling. In addition, this TCI state used for PDCCH may be used for the beam indication for the scheduled PDSCH. FIG. 3 illustrates one example of the number of PT-RS AP(s) determination when TCI is present.

Figure 4:
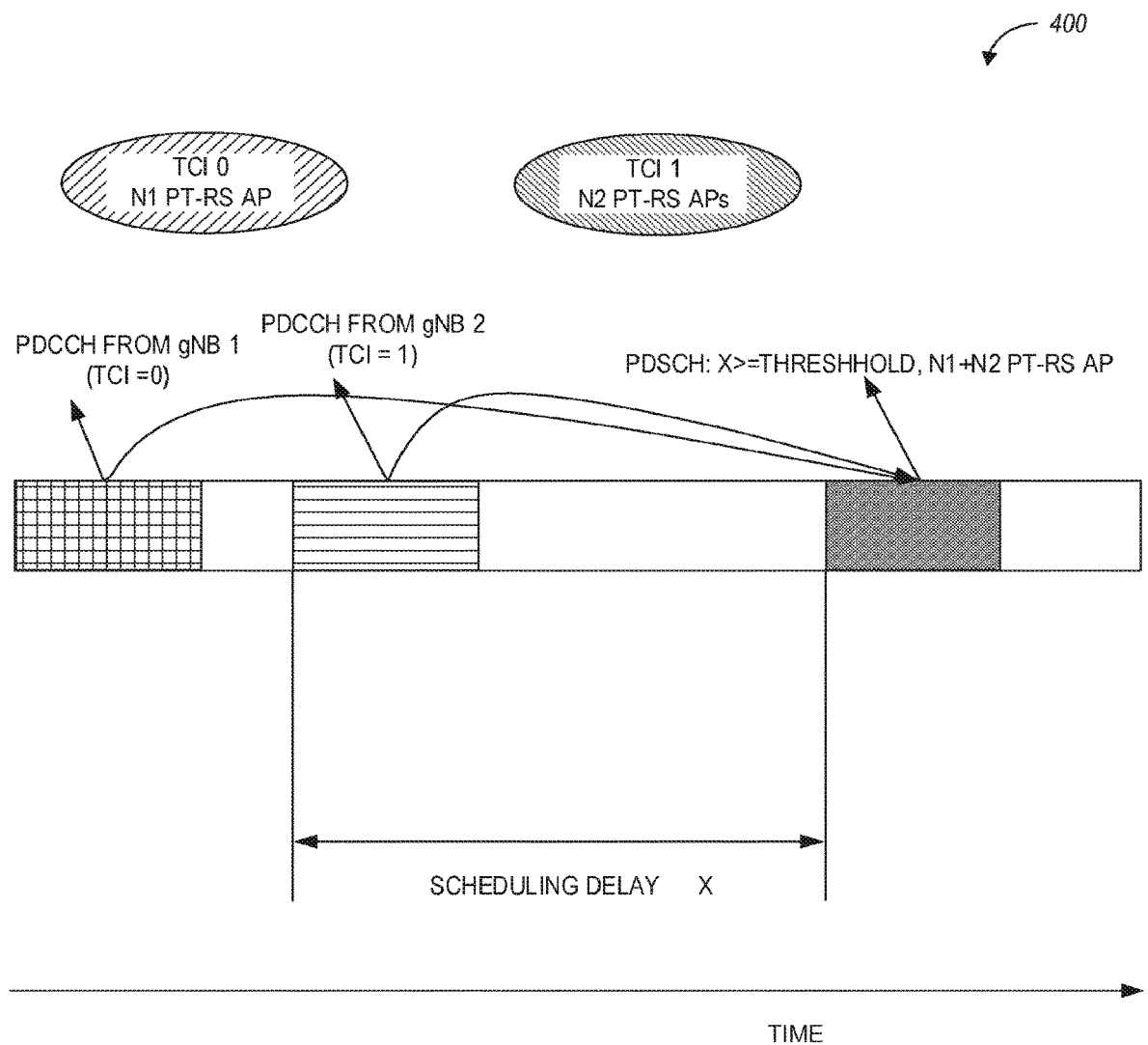
FIG. 4 illustrates an example for downlink (DL) PT-RS AP determination for multi-transmission/reception point (TRP) case, in accordance with some aspects.

FIG. 4 illustrates an example for downlink (DL) PT-RS AP determination 400 for multi-transmission/reception point (TRP) case, in accordance with some aspects. In some aspects, for multi-panel and multi-TRP operation, in a slot, a UE may receive multiple PDCCHs to schedule the data reception, then the number of PT-RS AP(s) in a slot can be equal to the sum of number of PT-RS AP(s) or maximum/minimal number of PT-RS APs in the TCI states based on the scheduling PDCCHs. In one aspect, if the number of PT-RS AP(s) from TCI state of PDCCH 1 is N1 and that from TCI state of PDCCH 2 is N2, the total number of PT-RS AP(s) is N1+N2 if the PDSCH is scheduled in the same slot. Alternatively, the number of PT-RS AP(s) could be max(N1, N2) or min(N1, N2) or either N1 or N2. If the PDSCH is scheduled in different slots, the number of PT-RS AP(s) can be determined by the corresponding PDCCH. Alternatively, the PT-RS APs from different TRP may be orthogonal, so that the number of PT-RS APs for each TRP can be determined independently by the TCI state in corresponding TCI. FIG. 4 illustrates one example associated with the above aspects.

In another aspect, in the absence of DCI signaled TCI containing the number of PT-RS AP(s), the number of PT-RS AP(s) can be determined by the high layer RRC configured default number of PT-RS APs. In yet another aspect, the number of PT-RS APs used in the latest scheduled PDSCH or the lowest CORESET-ID in the latest slot in which UE is configured with one or more CORESETS can be also reused for the current scheduled PDSCH. These two approaches can be also applied to the situation where the PDSCH is scheduled at the symbol earlier than the UE defined threshold.

In some aspects, the above techniques can also apply for the case when cross-carrier or cross-bandwidth part (BWP) scheduling is used. In cross-carrier and cross-BWP scheduling, the DCI and the data can be transmitted in different carrier or BWPs, respectively. In an example, the TCI could be present in one DCI but it could be not present in another DCI. Then the above aspects for the TCI present and TCI not present case can be applied.

Uplink PT-RS AP(s) Indication

For uplink communications, PT-RS AP(s) indication can be based on the precoder for the codebook-based scheme and on the SRI for the non-codebook-based scheme. For codebook and non-codebook based scheme, the following issues can be addressed using techniques disclosed herein: (a) how to determine the uplink PT-RS AP(s) when subband precoder is used; and (b) how to determine the uplink PT-RS AP(s) when multiple DCIs are used.

Figure 5:
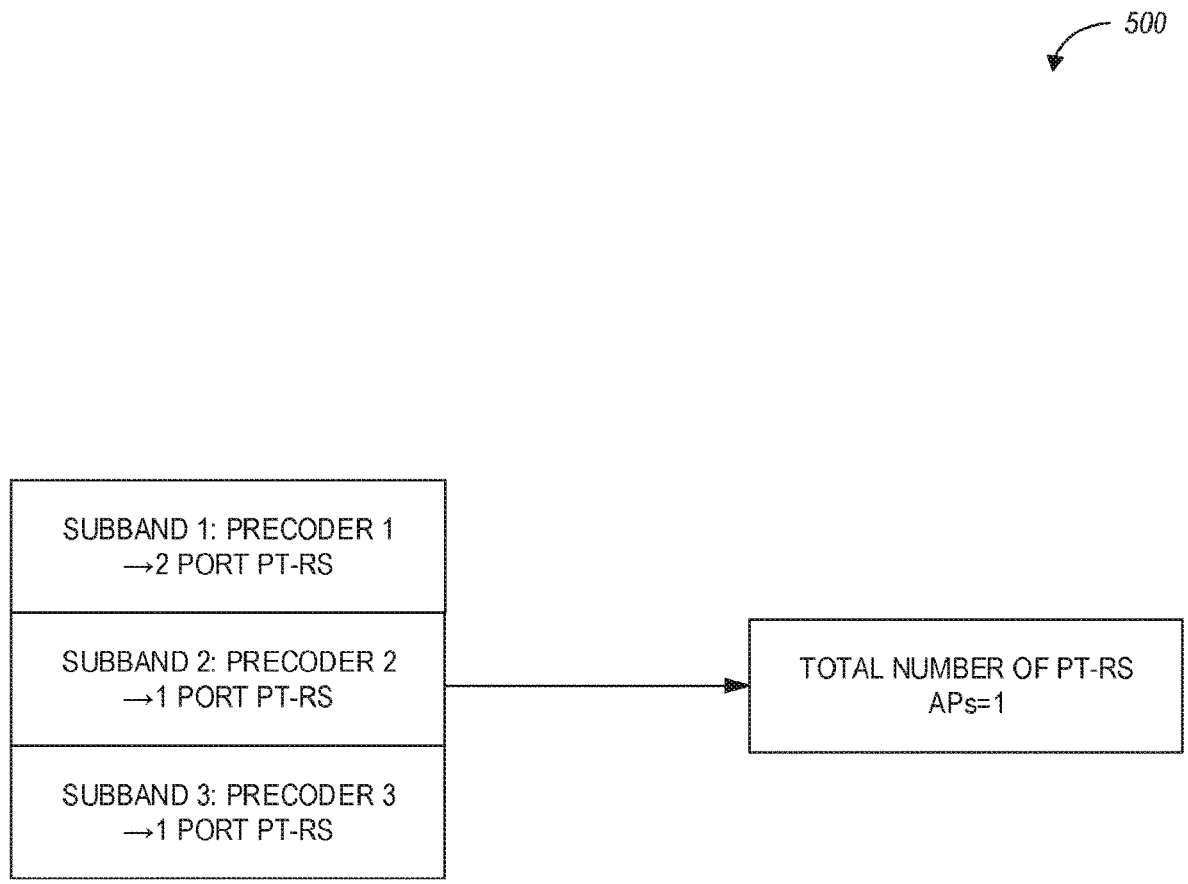
FIG. 5 illustrates an example for PT-RS AP determination for uplink codebook-based transmission scheme, in accordance with some aspects.

FIG. 5 illustrates an example for PT-IRS AP determination 500 for uplink codebook-based transmission scheme, in accordance with some aspects. In an aspect, for codebook-based transmission scheme when subband precoder is used, Nj can be denoted as the number of PT-RS AP(s) for the precoder of subband j, with the number of PT-RS AP(s) can be $\min\{N1, N2, \ldots, Nk\}$ or $\max\{N1, N2, \ldots, Nk\}$, or Nx where k denotes the maximum number of subband and x can be predefined or configured by higher layer signaling. Alternatively, if the precoder for each subband is based on a two-stage precoder W1W2, where W1 is the wideband precoder and W2 is the subband precoder, the PT-RS APs can be determined by the wideband precoder. FIG. 5 illustrates one example for this case. Alternatively, the number of PT-RS AP(s) can be different in different subbands, which can be determined by the precoder of each subband.

In some aspects, for codebook-based transmission schemes, when multiple DCIs are used, the number of PT-RS AP(s) can be determined by the sum of the PT-RS AP(s) or maximum/minimal number of PT-RS APs from all the DCIs, which is the same as the downlink.

In another aspect, for non-codebook-based transmission scheme, if multiple subband SRI(s) are indicated, the PT-RS AP index used for the same SRS resource can be the same. Then the total number of PT-RS AP(s) can be determined by the number of PT-RS AP index configured in each scheduled subband SRI(s). In another aspect, the number of PT-RS AP(s) can be different in different subband and can be determined by the subband SRI(s) in each subband.

Figure 6:
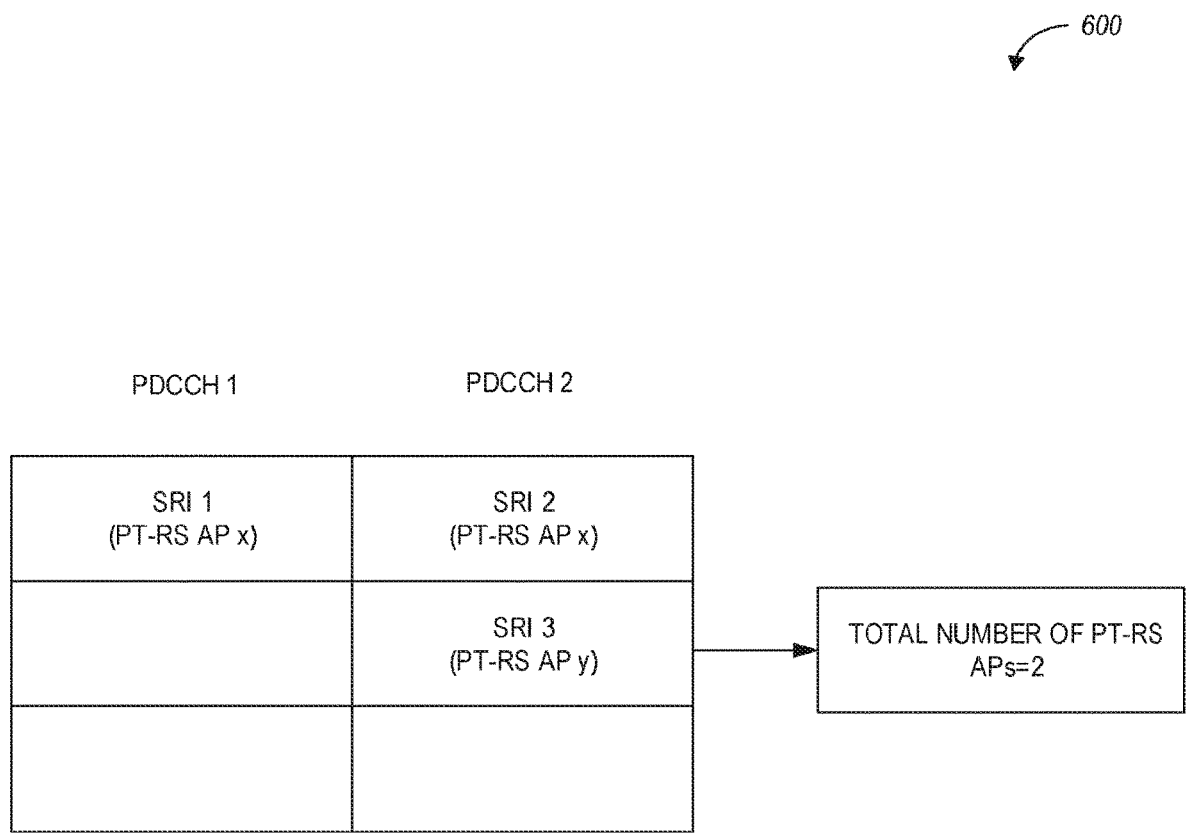
FIG. 6 illustrates an example for PT-RS AP determination, in accordance with some aspects.

FIG. 6 illustrates an example for PT-RS AP determination 600, in accordance with some aspects. In some aspects, for non-codebook-based transmission schemes, when multiple DCIs are scheduled, the number of PT-RS AP(s) can be determined by the number of PT-RS AP index configured in all the scheduled SRI(s) in all the DCI, or determined by the number of PT-RS AP index configured in the scheduled SRI(s) in a DCI. FIG. 6 illustrates one example for this case, where SRI 1 and 2 can share the same PT-RS AP. Therefore, the total number of PT-RS APs can be 2. Alternatively, the number of PT-RS AP can be decided by one PDCCH independently and the total number of PT-RS APs can be sum or maximum or a minimum of the PT-RS APs for all PDCCHs.

In another aspect, for uplink subband precoding and/or the multi-panel and multi-TRP operation, the number of PT-RS APs can be configured by higher layer signaling or DCI. Alternatively, for uplink transmission, the UE shall expect the subband precoder or subband SRI(s) should indicate the same number of PT-RS APs, and the TIE shall expect the multiple DCIs scheduling a PUSCH transmission in a slot should configure the same number of PT-RS APs.

In some aspects, a UE can include circuitry to determine the number of Phase Tracking Reference Signal (PT-RS) Antenna Ports (APs). For the downlink, when UE receives the PDCCH from a CORESET where the TCI is not present, the UE may determine the number of DL PT-RS AP(s) based on a TCI state used for the PDCCH scheduling the PDSCH. The PDCCH or its CORESET can be predefined to be the one scheduling current PDSCH and/or configured by higher layer signaling. The PDCCH or its CORESET may be used for the default PDSCH beam indication. For the downlink, if the TCI is present and the scheduling offset is below a threshold, the number of DL PT-RS AP(s) can be based on a TCI state used for the PDSCH, which can be predefined and/or configured by higher layer signaling. For downlink multi-panel and multi-TRP operation, in a slot, the number of PT-RS AP(s) in a slot can be equal to the sum of a number of PT-RS AP(s) or maximum/minimal number of PT-RS APs in the TCI states based on the scheduling PDCCHs.

In aspects when no TCI is used or when scheduling offset is below a threshold or multi-panel and multi-TRP operation, the number of downlink PT-RS APs can be configured by DCI or higher layer signaling or predefined or be determined by the latest PDSCH transmission.

In some aspects, for uplink codebook-based transmission scheme when subband precoder is used, Nj can be denoted as the number of PT-RS AP(s) for the precoder of subband j. The number of PT-RS AP(s) can be min{N1, N2, ... , Nk} or max{N1, N2, ... , Nk}, or Nx where k denotes the maximum number of subband and x can be predefined or configured by higher layer signaling.

In some aspects, for uplink codebook-based transmission scheme, when multiple DCI is used, the number of PT-RS AP(s) can be determined by the sum of the PT-RS AP(s) or maximum/minimal number of PT-RS APs from all the DCIs. In some aspects, for uplink non-codebook-based transmission scheme, if multiple subband SRI(s) are indicated, the total number of PT-RS AP(s) can be determined by the number of PT-RS AP index configured in each scheduled subband SRI(s). In some aspects, for non-codebook-based transmission scheme, when multiple DCI is scheduled, the number of PT-RS AP(s) can be determined by the number of PT-RS AP index configured in all the scheduled SRI(s) in all the DCI, or determined by the number of PT-RS AP index configured in the scheduled SRI(s) in a DCI. The number of uplink PT-RS APs can be configured by DCI or higher layer signaling, or predefined, or be determined by the latest PUSCH transmission.

In some aspects, the UE may assume the uplink subband precoder or subband SRI(s) indicates the same number of PT-RS APs in each subband. In some aspects, the UE may assume the same number of PT-RS APs should be indicated in each DCIs if multiple DCI is used to schedule one PUSCH transmission.

In some aspects, for downlink multi-panel and multi-TRP operation, the number of PT-RS APs for each TRP can be determined by the TCI state in each DCI independently and the PT-RS APs can be multiplexed in a non-orthogonal or orthogonal manner. In some aspects, for uplink multi-panel and multi-TRP operation, the number of PT-RS APs for each TRP can be determined by the SRI or precoder indicated by Transmit Precoder Matrix indicator (TPMI) and/or Transmit Rank Indicator (TRI) in each DCI independently, and the PT-RS APs can be multiplexed in a non-orthogonal or orthogonal manner. In some aspects, for uplink subband precoding, the number of PT-RS APs can be determined by a wideband precoder. The wideband precoder can be indicated by the DCI. The wideband precoder can be used to determine the subband precoder. The DCI from the same gNB or different gNB can be transmitted in a second carrier or bandwidth part.

In some aspects associated with wireless communication systems (e.g., 5G communication systems), the PT-RS is used to compensate for the phase shift caused by phase noise and frequency offset. The time domain PT-RS pattern (i.e., time domain PT-RS density) can be every symbol, every other symbol, and every 4th symbol. In some aspects, the PT-RS density can be determined based on the modulation and coding scheme (MCS) information within downlink control information (DCI). Since the phase shift can be common for some antenna ports, the number of antenna port (AP) for PT-RS can be equal to or smaller than the antenna ports for the demodulation reference signal (DM-RS). In one aspect, there can be up to 2 PT-RS APs and up to 12 DM-RS APs used in the wireless communication system. Techniques disclosed herein can be used to define the transmission power ratio for PT-RS and a data channel.

In some aspects, the Time Domain Orthogonal Cover Code (TD-OCC) for DM-RS and PT-RS with time domain density of every symbol may not be configured simultaneously in a slot, then the number of DM-RS APs can be configured to be half of the maximum number of DM-RS APs. However, the TD-OCC and PT-RS with the time domain density of every other symbol and every 4th symbol may be configured at one time. In this case, the DM-RS APs can be equal to the maximum number of DM-RS APs. Techniques disclosed herein can be used to define power boosting for PT-RS in downlink as well as uplink communications.

The various tables illustrated in FIGS. 7A-10 and FIGS. 12-13 provide PT-RS power boosting values measured in dB.

FIG. 7A is a table 700A indicating physical downlink shared channel to PT-RS energy per resource element (PDSCH-to-PT-RS EPRE) ratio and associated PT-RS power boosting, in accordance with some aspects. FIG. 7B is a table 700B indicating physical uplink shared channel to PT-RS energy per resource element (PUSCH-to-PT-RS EPRE) ratio and associated PT-RS power boosting, in accordance with some aspects.

For downlink communications, PDSCH to PT-RS Energy Per Resource Element (EPRE) ratio can be $10 \log 10(N\_PTRS)$, where N_PTRS is the number of DM-RS antenna ports associated with a PT-RS antenna ports. The downlink PDSCH-to-PT-RS EPRE can be indicated as A_DL, where A_DL can be configured as illustrated in Table 700A in FIG. 7A. For uplink communications, the EPRE ratio between PUSCH to PT-RS can be indicated as A_UL, where A_UL can be configured as indicated in Table 700B in FIG. 7B. As illustrated in FIG. 7A, downlink PT-RS power boosting is provided for A_DL of 00 and no PT-RS power boosting is provided for A_DL 01, with A_DL values of 10 and 11 being reserved for future use. As illustrated in FIG. 7B, uplink PT-RS power boosting is provided only for A_UL of 00, while A_UL values of 01, 10, and 11 are reserved for future use.

Downlink PT-RS Power Boosting

Techniques disclosed herein can be used to address downlink PT-RS power boosting associated with the following two issues: (a) the boosting power may exceed the maximum transmission power for one power amplifier (PA); and (b) the TD-OCC of DMRS may be used if the time domain density of PT-RS is not every symbol.

The transmission signal in RF chains for one resource element (RE) can be generated as Y=WX, where W denotes the precoder and X indicates the transmission symbol. In one aspect, the transmission signal in two RF chains for a data RE can be represented by the following equation:

$$\begin{bmatrix} y_{1,k} \\ y_{2,k} \end{bmatrix} = \frac{1}{\sqrt{2}} \begin{bmatrix} 1 & 0 \\ 0 & 1 \end{bmatrix} \begin{bmatrix} x_1 \\ x_2 \end{bmatrix} = \begin{bmatrix} \frac{1}{\sqrt{2}} x_1 \\ \frac{1}{\sqrt{2}} x_2 \end{bmatrix} \quad (1)$$

For PT-RS RE, if one PT-RS AP is used, the transmission signal in two RE chains can be represented by the following equation:

$$\begin{bmatrix} y_{1,k'} \\ y_{2,k'} \end{bmatrix} = \frac{1}{\sqrt{2}} \begin{bmatrix} 1 \\ 0 \end{bmatrix} x_3 = \begin{bmatrix} \frac{1}{\sqrt{2}} x_3 \\ 0 \end{bmatrix} \quad (2)$$

In aspects when one power amplifier (PA) is used for one RF chain and the power boosting values defined in Table 700A are used, there could be some power borrowing from PA2 to PA1, and the transmission power of the PA for RF chain 1 would exceed the maximum transmission power. Additionally, the power of each layer of precoder W may be different, then if power boosting is used and the power of the first layer of the precoder is larger than others layers which are used for PT-RS precoding, the transmission power may exceed the maximum transmission power.

FIG. 8 is a table 800 indicating PDSCH-to-PT-RS EPRE ratio (or A_DL ratio) and associated PT-RS power boosting when PT-RS density is every symbol, in accordance with some aspects. In an exemplary aspect, the maximum power boosting ratio for PT-RS (as illustrated in Table 800) can be determined based on the number of RF chains per PA and/or the precoder. As illustrated in Table 800, PT-RS power boosting values can be used for A_DL ratios of 00, 01, 10, and 11, with a maximum PT-RS power boosting of 7.78 dB used when A_DL is 11 and the number of DM-RS antenna ports are 6. In some aspects, a gNB can use a default A_DL ratio of 00 (i.e., no PT-RS power boosting is used).

FIG. 9 is a table indicating PDSCH-to-PT-RS EPRE ratio and associated PT-RS power boosting when a number of DM-RS ports associated to a PT-RS port is above six and PT-RS density is every other symbol or every fourth symbol, in accordance with some aspects. In some aspects, when the time domain density of PT-RS is every other symbol or every 4th symbol, the TD-OCC of DM-RS may be used. In this regard, the maximum number of DM-RS APs can be 12. Table 900 illustrates PT-RS power boosting (based on A_DL ratio and the number of DM-RS ports) for downlink communications, which power boosting can be used when PT-RS density is every other symbol or every 4th symbol. As illustrated in Table 900, a maximum PT-RS power boosting of 10.79 dB can be used for downlink transmissions corresponding to A_DL ratio of 11 and 12 DM-RS antenna ports are used.

Uplink PT-RS Power Boosting

In some aspects, to simplify the UE implementation for PT-RS power boosting, the transmission for each symbol in a PA can be the same. As shown in equations (1) and (2) above, if the UE has one PA per RF chain, the transmission power may exceed the maximum transmission power for at least one precoder.

FIG. 10 is a table 1000 indicating physical uplink shared channel-to-PT-RS EPRE (PUSCH-to-PT-RS EPRE) ratio and associated PT-RS power boosting, in accordance with some aspects. In some aspects, table 1000 can be defined for uplink PT-RS power boosting, with regard to different precoders and different PA implementation aspects for uplink communications at the UE side.

In some aspects, the UE can be configured to report its capability of preferred PUSCH-to-PT-RS EPRE ratio (e.g., A_UL) when the PT-RS density is every symbol or every other symbol, which indicates that the UE can keep the same transmission power for each symbol based on this value. For example, the UE can determine the preferred A_UL based on the UE's antenna structure (e.g., based on how many antenna elements can be mapped to a single power amplifier). In some aspects, the gNB can configure the PUSCH-to-PT-RS EPRE ratio independently for different PT-RS time domain densities by using RRC signaling, which determination can be based on the preferred A_UL indicated by the UE. Alternatively, the UE can report its capability of a maximum PUSCH-to-PT-RS EPRE ratio and the gNB can determine the A_UL for communication to the UE based on the indicated maximum A_UL and/or PT-RS density.

In some aspects, the A_UL ratio illustrated in the PT-RS power boosting tables discussed herein can be communicated to the UE by higher layer signaling from the gNB, such as radio resource control (RRC) signaling. Additionally, the gNB can communicate the number of PUSCH layers (which is the same as the number of DM-RS ports for use by the UE) using control signaling (e.g., DCI signaling in PDCCH) or higher layer signaling (e.g., RRC signaling in PDSCH)

Figure 11:
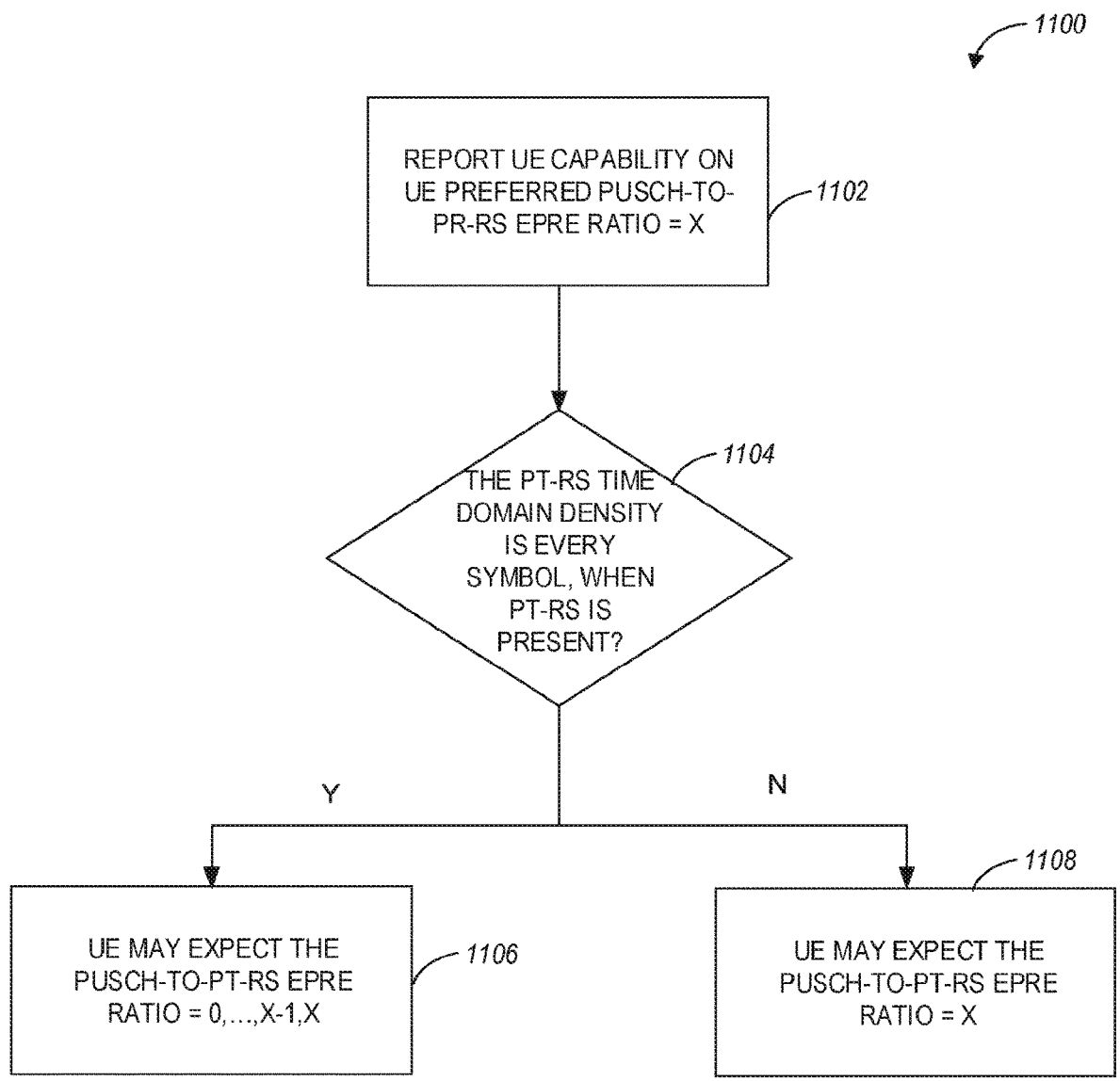
FIG. 11 illustrates generally a flowchart of example functionalities which can be performed in a wireless architecture in connection with uplink PT-RS power boosting, in accordance with some aspects.

FIG. 11 illustrates generally a flowchart of example functionalities of a method 1100, which can be performed in a wireless architecture in connection with uplink PT-RS power boosting, in accordance with some aspects. Referring to FIG. 11, the method 1100 may start at 1102, when the UE reports its preferred PUSCH-to-PT-RS EPRE ratio as X (e.g., X can be reported as "01"). At 1104, a determination is made (e.g., by the gNB) as to whether the PT-RS time domain density is every symbol when PT-RS is to configured. At 1106, if the PT-RS density is every symbol, the UE may expect the A_UL ratio to be in the range of 0, ... X−1, X. At 1108, if the PT-RS density is every other symbol or every $4^{th}$ symbol, the UE may expect the A_UL ratio to be configured as X (i.e., the highest ratio indicated by the UE as the preferred ratio). In this regard, if the preferred A_UL ratio is reported by the UE as 01, the UE can expect the gNB to configure the PUSCH-to-PT-RS EPRE ratio to be '00' or '01' when the time domain density of PT-RS is every symbol, and the UE can expect the gNB to configure the PUSCH-to-PT-RS EPRE ratio to be '01' when the time domain density of PT-RS is every other symbol or every 4th symbol.

FIG. 12A is a table 1200 indicating PUSCH-to-PT-RS EPRE ratio and associated PT-RS power boosting based on a transmission scheme, in accordance with some aspects. In some aspects, the UE can use the following transmission schemes: a codebook-based transmission scheme or a non-codebook-based transmission scheme. In some aspects, the UE can be configured to use a non-codebook-based transmission scheme based on the LE's AP combining capabilities (i.e., all antenna ports can be used) or based on UE's antenna selection capabilities (i.e., whether some APs can be turned off and power can be boosted for remaining APs). In this regard, fully coherent codebook-based transmission can be used with antenna combining (i.e., no antenna ports are turned off), and partial coherent or non-coherent transmission can be used with antenna selection (i.e., one or more antenna ports can be turned off at the UE).

In some aspects, the gNB can use DCI signaling to indicate the precoder to be used by the UE. The UE can then determine the precoder type (e.g., coherent, non-coherent or partially coherent) based on the indicated precoder. In some aspects, the precoder can be communicated to the UE via precoder information within the DCI. More specifically, the UE can determine the precoder based on one or both of a Transmission Precoder Matrix Index (TPMI) and a transmission rank indicator (TRI) within the DCI.

In some aspects, for a non-codebook-based transmission scheme, the UE may apply different transmission power for different PUSCH layers (or different DM-RS ports). Consequently, the PT-RS power boosting factor PUSCH-to-PT-RS EPRE ratio may be different for a codebook-based transmission scheme and a non-codebook-based transmission scheme. In some aspect, the gNB can configure this PT-RS power boosting factor independently for different transmission schemes.

In some aspects, for non-codebook-based transmission, the PT-RS power boosting factor can be determined by whether associated channel state information reference signal (CSI-RS) is configured. In one aspect, if associated CSI-RS is configured, the power boosting factor used for coherent transmission for UL codebook-based transmission can be used. In another aspect, if associated CSI-RS is not configured, the PT-RS power boosting factor used for non-coherent transmission for UL codebook-based transmission can be used. Table 1200 in FIG. 12A illustrates one example for the UL PT-RS power boosting factors, where "non-codebook case 1-" denotes the case when associated CSI-RS is configured and "non-codebook case 2" indicates the case when associated CSI-RS is not configured.

As illustrated in Table 1200, the PT-RS power boosting factor of (3×Qp−3) can be used for some PUSCH layers for A_UL of 00. The parameter Qp can indicate the number of antenna ports for PT-RS transmission, and Qp can be configured by the gNB via higher layer signaling (e.g., RRC signaling). Additionally, the gNB can further indicate the transmission scheme for the UE via the same higher layer signaling.

FIG. 12B is a table 1250 indicating PUSCH-to-PT-RS EPRE ratio and associated PT-RS power boosting based on a transmission scheme, in accordance with some aspects. As seen in FIG. 12A and FIG. 12B, the PT-RS power boosting factors in table 1250 are the same as the PT-RS power boosting factors listed in table 1200. However, table 1250 separates the number of PUSCH layers by transmission coherency and transmission scheme type (and not based on CSI-RS configuration).

In some aspects, for codebook-based transmission, the PUSCH-to-PT-RS EPRE ratio may be determined by the precoder type (i.e., non-coherent based, partial coherent based, and coherent based precoder). In some aspects, the UE can report the capability of its preferred PUSCH-to-PT-RS EPRE ratio for different precoder types. In some aspects, for a non-coherent precoder, a value of '00' may be configured for the A_UL; for a partial-coherent precoder, a value of '01' may be configured for the A_U; and for a coherent precoder, a value of '10' may be configured for the A_UL.

In some aspects, to keep the same transmission power for all the RF chains, the precoder for the PT-RS can be generated from all the layers for the DM-RS group for some TRI and TPMIs. For example, for a 2 Tx codebook, the TRI=1, and TPMI=0; and for a 4 Tx codebook, the TRI and TPMI for non-coherent transmission and/or partial coherent transmission. As used herein, the term "2 Tx codebook" and "4 Tx codebook" indicates a codebook for 2 or 4 antenna port transmission. FIG. 13 is a table indicating precoder (W) values for a 2 Tx codebook scenario, in accordance with some aspects. Table 1300 illustrates one example for the 2 Tx codebook for rank 2. When TPMI=0, the precoder of PT-RS can be generated based on the averaging of the 2 layers, and when TPMI=1 or 2, the precoder of PT-RS can be the same as one layer indicated by DCI, e.g. 0 or 1. Alternatively, if PT-RS is present, then TPMI and TRI may not be configured.

Figure 14:
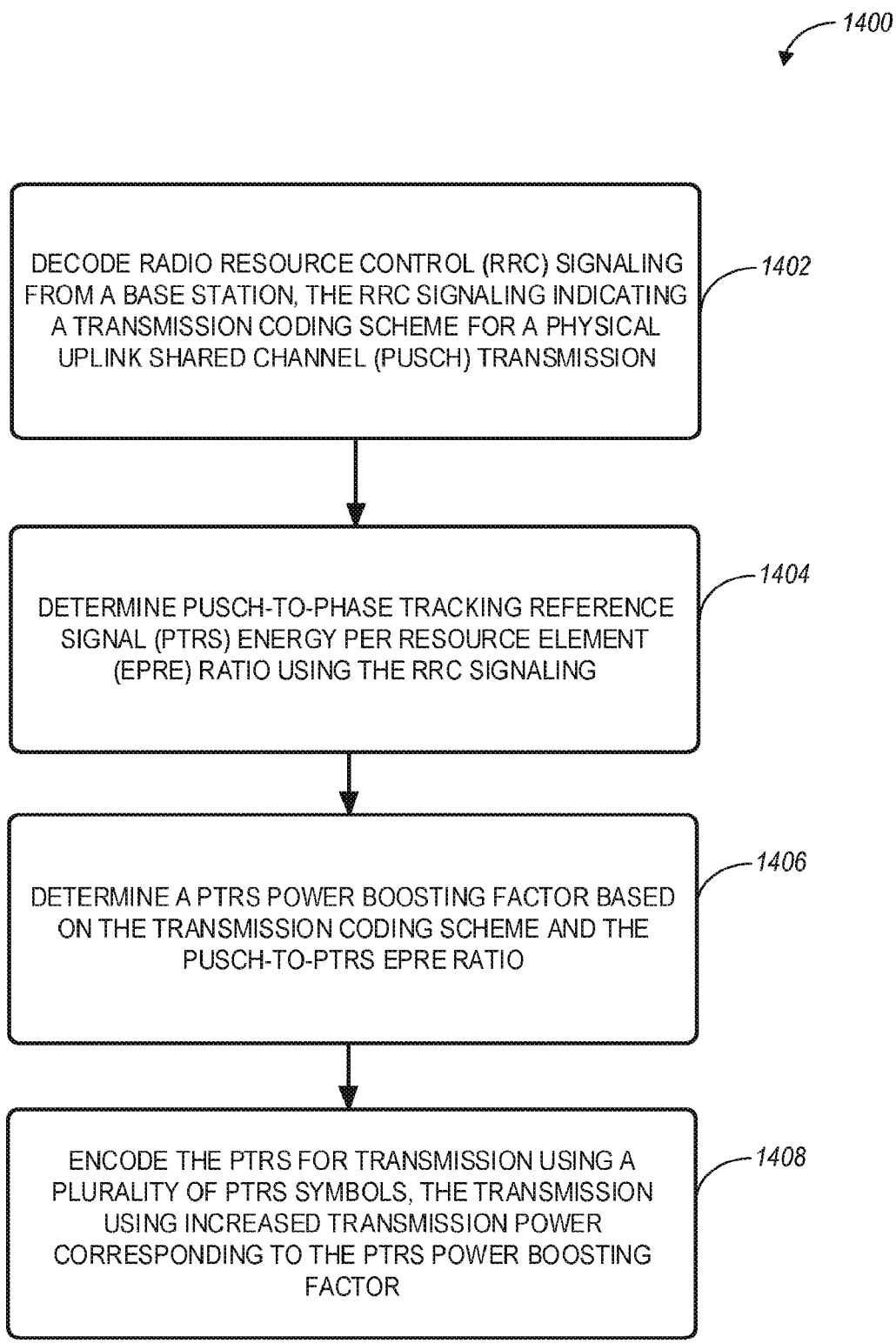
FIG. 14 illustrates generally a flowchart of example functionalities which can be performed in a wireless architecture in connection with PT-RS power boosting, in accordance with some aspects.

FIG. 14 illustrates generally a flowchart of example functionalities of a method 1400 which can be performed in a wireless architecture in connection with PT-RS power boosting, in accordance with some aspects. The method 1400 includes operations 1402, 1404, 1406, and 1408. By way of example and not limitation, the method 1400 is described as being performed by the UE 101, which can be the same as device 1500 in FIG. 15. Referring to FIG. 14, the method 1400 can start at operation 1402 when radio resource control (RRC) signaling (e.g., 190A) from a base station can be decoded. The RRC signaling can indicate a transmission coding scheme for a physical uplink shared channel (PUSCH) transmission (e.g., codebook-based or non-codebook-based). At operation 1404, a PUSCH-to-phase tracking reference signal (PT-RS) energy per resource element (EPRE) ratio can be determined using the RRC signaling. For example, the RRC signaling can configure/indicate the PUSCH-to-PT-RS EPRE (e.g., A_UL) ratio for the UE. At operation 1406, a PT-RS power boosting factor is determined based on the transmission coding scheme and the PUSCH-to-PT-RS EPRE ratio (e.g., based on Table 1300 or 1350). At operation 1408, the PT-RS is encoded for transmission using a plurality of PT-RS symbols, the transmission using increased transmission power corresponding to the PT-RS power boosting factor.

In some aspects, a UE can include circuitry to determine the Energy Per Resource Element (EPRE) ratio between PT-RS and PDSCH/PUSCH and to determine the precoder for PT-RS transmission. The EPRE ratio between PT-RS and PUSCH can correspond to the number of Demodulation Reference Signal (DM-RS) antenna ports associated to the PT-RS antenna port (AP) as well as a maximum PT-RS power boosting factor. The maximum power boosting factor can be configured by the gNB. The EPRE ratio between PT-RS and PDSCH can be different in different PT-RS densities. The EPRE ratio between PT-RS and PUSCH can correspond to the number of DM-RS antenna ports associated with the PT-RS AP as well as a maximum power boosting factor. The UE can report its capability of preferred EPRE ratio between PT-RS and PUSCH or a maximum EPRE ratio between PT-RS and PUSCH. The EPRE ratio between PT-RS and PUSCH can be different in different PT-RS densities, or in different uplink transmission schemes, or in different uplink precoders for PUSCH. The precoder of PT-RS can be determined by the PUSCH precoder and/or EPRE ratio between PT-RS and PUSCH.

In some aspects, for a 2 antenna port UE, if the indicated transmit precoder matrix indicator (TPMI) is 0 and transmit rank indicator (TRI) is 1, the PT-RS precoder can be equal to the averaging of all the layers; otherwise, the PT-RS precoder can be the same as one DM-RS AP indicated by the downlink control information (DCI). If PT-RS is present, for a 2 antenna port UE, the UE may not expect the gNB to configure TRI=1 and TPMI=0. In some aspects, for a 4-antenna port UE, if the indicated TPMI and TRI is used for non-coherent or partial coherent transmission, the PT-RS precoder can be equal to the averaging of all the layers in a DMRS group; otherwise, the PT-RS precoder can be the same as one DM-RS AP indicated by the DCI. In some aspects, for a 4-antenna port UE, the UE may not expect the gNB to configure uplink precoder for non-coherent or partial coherent transmission.

In some aspects, for uplink non-codebook-based transmission, the PT-RS power boosting ratio can be determined based at least on the configuration of associated CSI-RS.

In some aspects, the PT-RS power boosting factor can be the same as the power boosting factor used for non-coherent, coherent, or partial-coherent transmission in a codebook-based transmission.

In some aspects, when associated CSI-RS is not configured, the PT-RS power boosting factor can be the same as the power boosting factor used for non-coherent transmission in a codebook-based transmission.

In some aspects, when associated CSI-RS is configured, the PT-RS power boosting factor can be the same as the power boosting factor used for coherent transmission in codebook based transmission.

Figure 15:
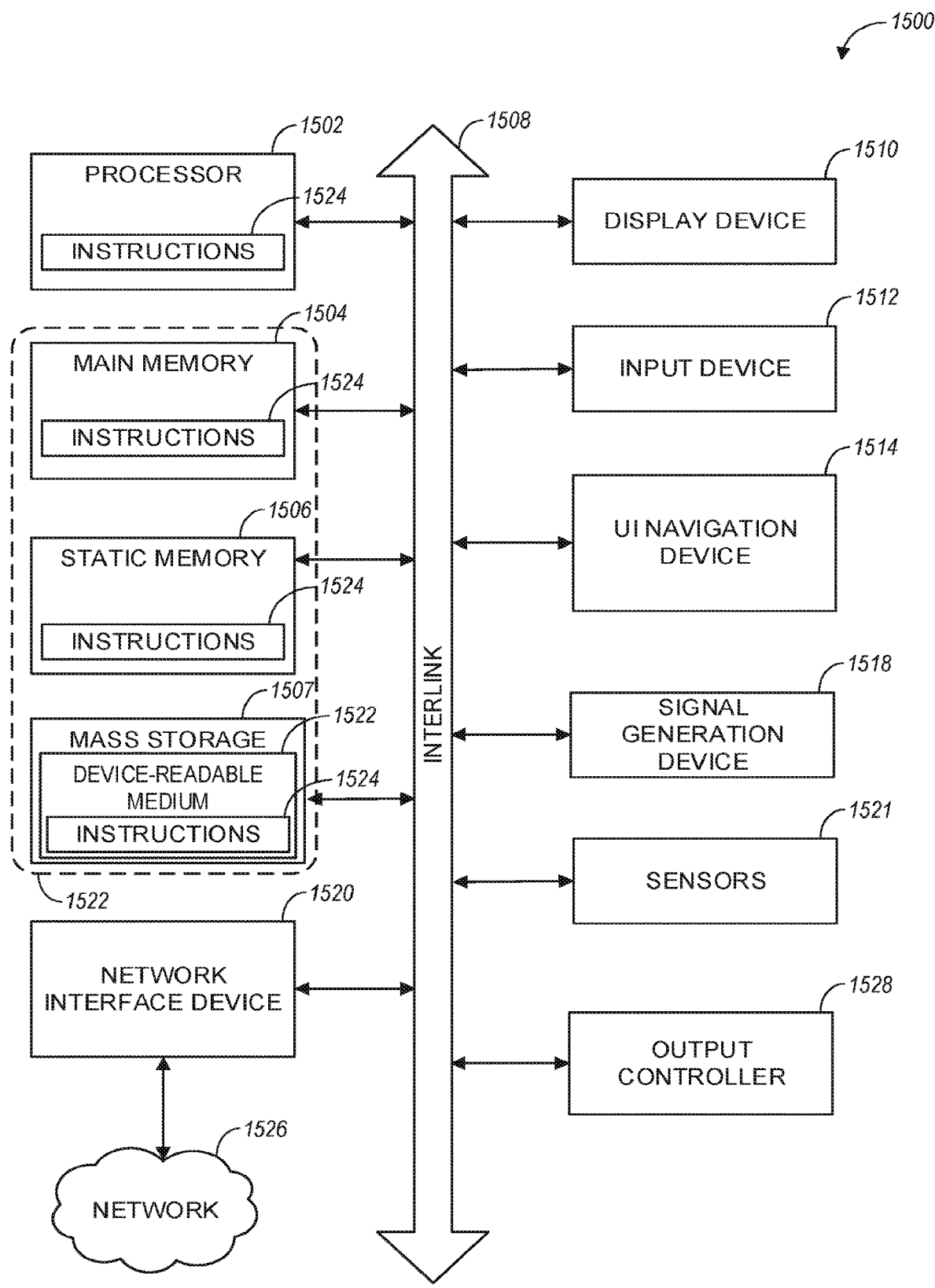
FIG. 15 illustrates a block diagram of a communication device such as an evolved Node-B (eNB), a new generation Node-B (gNB), an access point (AP), a wireless station (STA), a mobile station (MS), or a user equipment (UE), in accordance with some aspects.

FIG. 15 illustrates a block diagram of a communication device such as an evolved Node-B (eNB), a next generation Node-B (gNB), an access point (AP), a wireless station (STA), a mobile station (MS), or a user equipment (UE), in accordance with some aspects. In alternative aspects, the communication device 1500 may operate as a standalone device or may be connected (e.g., networked) to other communication devices.

Circuitry (e.g., processing circuitry) is a collection of circuits implemented intangible entities of the device 1500 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 1500 follow.

In some aspects, the device 1500 may operate as a standalone device or may be connected (e.g., networked) to other devices. In a networked deployment, the communication device 1500 may operate in the capacity of a server communication device, a client communication device, or both in server-client network environments. In an example, the communication device 1500 may act as a peer communication device in peer-to-peer (P2P) (or other distributed) network environment. The communication device 1500 may be a UE, eNB, PC, a tablet PC, a STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. The software may accordingly configure a hardware processor, for example, to constitute a particular module at one instance of time and to constitute a different module at a different instance of time.

Communication device (e.g., UE) 1500 may include a hardware processor 1502 (e.g., a central processing unit (CPU), a graphics processing unit (GPU), a hardware processor core, or any combination thereof), a main memory 1504, a static memory 1506, and mass storage 1507 (e.g., hard drive, tape drive, flash storage, or other block or storage devices), some or all of which may communicate with each other via an interlink (e.g., bus) 1508.

The communication device 1500 may further include a display device 1510 an alphanumeric input device 1512 (e.g., a keyboard), and a user interface (UI) navigation device 1514 (e.g., a mouse). In an example, the display device 1510, input device 1512 and UI navigation device 1514 may be a touchscreen display. The communication device 1500 may additionally include a signal generation device 1518 (e.g., a speaker), a network interface device 1520, and one or more sensors 1521, such as a global positioning system (GPS) sensor, compass, accelerometer, or another sensor. The communication device 1500 may include an output controller 1528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1507 may include a communication device-readable medium 1522, on which is stored one or more sets of data structures or instructions 1524 (e.g., software) embodying or utilized by any one or more of the techniques or functions described herein. In some aspects, registers of the processor 1502, the main memory 1504, the static memory 1506, and/or the mass storage 1507 may be, or include (completely or at least partially), the device-readable medium 1522, on which is stored the one or more sets of data structures or instructions 1524, embodying or utilized by any one or more of the techniques or functions described herein. In an example, one or any combination of the hardware processor 1502, the main memory 1504, the static memory 1506, or the mass storage 1516 may constitute the device-readable medium 1522.

As used herein, the term "device-readable medium" is interchangeable with "computer-readable medium" or "machine-readable medium". While the communication device-readable medium 1522 is illustrated as a single medium, the term "communication device-readable medium" may include a single medium or multiple media (e.g., a centralized or distributed database, and/or associated caches and servers) configured to store the one or more instructions 1524.

The term "communication device-readable medium" may include any medium that is capable of storing, encoding, or carrying instructions (e.g., instructions 1524) for execution by the communication device 1500 and that cause the communication device 1500 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that not a transitory propagating signal.

The instructions 1524 may further be transmitted or received over a communications network 1526 using a transmission medium via the network interface device 1520 utilizing any one of a number of transfer protocols. In an example, the network interface device 1520 may include one or more physical jacks (e.g., Ethernet, coaxial, or phone jacks) or one or more antennas to connect to the communications network 1526. In an example, the network interface device 1520 may include a plurality of antennas to wirelessly communicate using at least one of single-input-multiple-output (SIMO), MIMO, or multiple-input-single-output (MISO) techniques. In some examples, the network interface device 1520 may wirelessly communicate using Multiple User MIMO techniques.

The term "transmission medium" shall be taken to include any intangible medium that is capable of storing, encoding or carrying instructions for execution by the communication device 1500, and includes digital or analog communications signals or another intangible medium to facilitate communication of such software. In this regard, a transmission medium in the context of this disclosure is a device-readable medium.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus of a base station, the apparatus comprising:
   one or more processors, configured to cause the base station to:
   encode radio resource control (RRC) signaling for transmission to a user equipment (UE), the RRC signaling indicating a transmission coding scheme for a physical uplink shared channel (PUSCH) transmission and a PUSCH-to-PT-RS energy per resource element (EPRE) ratio;
   encode a downlink control information (DCI) for transmission to the UE, the DCI including a modulation coding scheme (MCS) index and a PUSCH allocation;
   decode a PUSCH-to-phase tracking reference signal (PT-RS) received with uplink data via the PUSCH allocation, the PT-RS associated with PT-RS transmission power based on a PT-RS power boosting factor, wherein the PT-RS power boosting factor is based on the transmission coding scheme and the PUSCH-to-PT-RS EPRE ratio.

2. The apparatus of claim 1, wherein the RRC signaling further includes a flag enabling the PT-RS transmission.

3. The apparatus of claim 1, wherein the PUSCH-to-PT-RS EPRE ratio is 00 or 01, and wherein the transmission coding scheme is a codebook-based uplink transmission or non-codebook-based uplink transmission.

4. The apparatus of claim 1, wherein the one or more processors are further configured to:

encode configuration signaling for transmission to the UE, the configuration signaling indicating a number of demodulation reference signal (DM-RS) antenna ports for using to transmit the DM-RS, the number of DM-RS antenna ports selected from [1; 2; 3; or 4]; and encode radio resource control (RRC) signaling for transmission to the UE, the RRC signaling configuring a number of PT-RS antenna ports.

5. The apparatus of claim 4, wherein the PT-RS power boosting factor is further based on the number of DM-RS antenna ports and the number of PT-RS antenna ports.

6. The apparatus of claim 4, wherein the configuration signaling indicates a number of PUSCH layers for the PUSCH transmission, the number of PUSCH layers corresponding to the number of DM-RS antenna ports.

7. The apparatus of claim 4, wherein the configuration signaling is the RRC signaling or the DCI.

8. A method for operating a base station, comprising:
by the base station:
encoding radio resource control (RRC) signaling for transmission to a user equipment (UE), the RRC signaling indicating a transmission coding scheme for a physical uplink shared channel (PUSCH) transmission and a PUSCH-to-PT-RS energy per resource element (EPRE) ratio;
encoding a downlink control information (DCI) for transmission to the UE, the DCI including a modulation coding scheme (MCS) index and a PUSCH allocation;
decoding a PUSCH-to-phase tracking reference signal (PT-RS) received with uplink data via the PUSCH allocation, the PT-RS associated with PT-RS transmission power based on a PT-RS power boosting factor, wherein the PT-RS power boosting factor is based on the transmission coding scheme and the PUSCH-to-PT-RS EPRE ratio.

9. The method of claim 8, wherein the RRC signaling further includes a flag enabling the PT-RS transmission.

10. The method of claim 8, wherein the PUSCH-to-PT-RS EPRE ratio is 00 or 01, and wherein the transmission coding scheme is a codebook-based uplink transmission or non-codebook-based uplink transmission.

11. The method of claim 8, further comprising:
encoding configuration signaling for transmission to the UE, the configuration signaling indicating a number of demodulation reference signal (DM-RS) antenna ports for using to transmit the DM-RS, the number of DM-RS antenna ports selected from [1; 2; 3; or 4]; and
encoding radio resource control (RRC) signaling for transmission to the UE, the RRC signaling configuring a number of PT-RS antenna ports.

12. The method of claim 11, wherein the PT-RS power boosting factor is further based on the number of DM-RS antenna ports and the number of PT-RS antenna ports.

13. The method of claim 11, wherein the configuration signaling indicates a number of PUSCH layers for the PUSCH transmission, the number of PUSCH layers corresponding to the number of DM-RS antenna ports.

14. The method of claim 11, wherein the configuration signaling is the RRC signaling or the DCI.

15. A method for operating a user equipment (UE), comprising:
by the UE:
decoding baseband signals comprising radio resource control (RRC) signaling from a base station, the RRC signaling indicating a transmission coding scheme for a physical uplink shared channel (PUSCH) transmission;
determining a PUSCH-to-phase tracking reference signal (PT-RS) energy per resource element (EPRE) ratio using the RRC signaling;
determining a PT-RS power boosting factor based on the transmission coding scheme and the PUSCH-to-PT-RS EPRE ratio; and
encoding a PT-RS for transmission using a plurality of PT-RS symbols, the PT-RS transmission using increased transmission power corresponding to the PT-RS power boosting factor.

16. The method of claim 15, wherein the RRC signaling further includes a flag enabling the PT-RS transmission.

17. The method of claim 15, wherein the PUSCH-to-PT-RS EPRE ratio is 00 or 01, and wherein the transmission coding scheme is a codebook-based uplink transmission or non-codebook-based uplink transmission.

18. The method of claim 15, further comprising:
decoding configuration signaling from the base station, the configuration signaling indicating a number of demodulation reference signal (DM-RS) antenna ports for using to transmit the DM-RS, the number of DM-RS antenna ports selected from [1; 2; 3; or 4]; and
decoding radio resource control (RRC) signaling from the base station, the RRC signaling configuring a number of PT-RS antenna ports.

19. The method of claim 18, further comprising:
determining the PT-RS power boosting factor further based on the number of DM-RS antenna ports and the number of PT-RS antenna ports.

20. The method of claim 18, wherein the configuration signaling indicates a number of PUSCH layers for the PUSCH transmission, the number of PUSCH layers corresponding to the number of DM-RS antenna ports.

21. The method of claim 18, wherein the configuration signaling is the RRC signaling or downlink control information (DCI) signaling.

* * * * *